United States Patent [19]

Andersson

[11] Patent Number: 4,554,843
[45] Date of Patent: Nov. 26, 1985

[54] ADJUSTABLE STEERING COLUMN SUPPORT

[75] Inventor: Henry Andersson, Saltsjoboo, Sweden

[73] Assignee: Affarsverket FFV, Eskilstuna, Sweden

[21] Appl. No.: 581,059

[22] Filed: Feb. 17, 1984

[30] Foreign Application Priority Data

Feb. 23, 1983 [SE] Sweden .................................. 8301001

[51] Int. Cl.⁴ ............................................. B62D 1/18
[52] U.S. Cl. ....................................... 74/493; 74/591; 280/775
[58] Field of Search ................... 74/493, 591; 280/775

[56] References Cited

U.S. PATENT DOCUMENTS 3,955,439  5/1976  Meyer ................................ 280/775
4,407,166 10/1983  Protze ................................... 74/493

Primary Examiner—Larry I. Schwartz
Attorney, Agent, or Firm—James E. Nilles

[57] ABSTRACT

An adjustable steering column support comprising a support part (1) which is stationary mounted in the vehicle and a steering column carrier (2) which is longitudinally and angularly displacable in relation to said stationary part, and in which the stationary part (1) and the steering column carrier (2) are formed as two mirror-symmetrical halves which are kept together by means of cross bolts (14, 15) and an intermediate wedge locking means (3), which by a spring force (29) presses the two halves apart. Preferably both the stationary support part (1) and the steering column carrier (2) are formed with interleaved and cooperating locking plates (7, 8 and 9-11). One of the pairs of locking plates, preferably the locking plates (7, 8) of the stationary support part (1) are formed with two different through slots in which the through bolts (14, 15) are movable when displacing the steering column carrier (2) in relation to the stationary support part (1). Preferably at least one of the slots (26) is wider than the diameter of the through bolt (15), whereby the steering column carrier (1) can be moved angularly around the rear bolt (14) at the same time as being displaced in the longitudinal direction of the slots.

5 Claims, 5 Drawing Figures

ADJUSTABLE STEERING COLUMN SUPPORT

The present invention relates to an adjustable support, especially for the steering column of a vehicle and comprising a support part which is stationary mounted in the vehicle and a carrier for the steering column which is adjustably mounted in relation to said stationary part and by means of which the steering wheel can be moved axially in the forward and rearward direction of the steering column and at the same time can be raised and lowered so that the steering wheel gets the position which each respective driver considers to be the best.

It is possible to provide a controllable adjustment of the steering column carrier by means of a friction brake, which when released leaves the steering column free so that said column together with the steering wheel can be moved axially or rotated, and which when tightened locks the steering column in the actual position. The releasing and the locking, respectively, may be effect by means of a handle or any other means.

Such a friction brake, however, may get loose as a result of vibrations etc. so that the steering column suddenly and unintentionally is moved or rotated, for instance upon a strong steering movement. This may cause serious accident situations. A friction brake of the above mentioned type also demands a predetermined minimum pulling force to give the intended effective locking, and it may often be difficult to judge how strong said force should be. One person perhaps pulls the friction brake too gently, so that the steering wheel, upon a strong actuation, is moved or rotated as mentioned above, a second person perhaps pulls the friction brake too hard so that it is difficult to relieve the friction brake or even so that the threads of the brake or other means are damaged.

The object of the invention therefore is to solve the problem of providing an adjustable steering column support by means of which the steering column can be moved both axially in the longitudinal direction and be rotated, which gives an effective locking with an exactly predetermined locking force and which is released by the actuation of a handle or a similar means, but which differently from the above mentioned friction brake is automatically locked when the handle is let free. Such steering column support gives a predetermined locking force which is not dependent upon a pulling force, and the steering column carrier cannot unintentionally be released.

According to the invention a part of the steering column support which is stationary mounted in the vehicle and the steering column carrier are formed with co-operating locking plates, and the apparatus is formed so that said locking plates are pressed into friction locking in relation to each other in the normal non-actuated state, and so that the friction plates upon actuation of an adjustment means are released from each other, whereby the steering column carrier can be moved axially and rotated in relation to the stationary column support part.

Preferably the stationary part and the steering column carrier are formed with several interengaging friction plates, and the locking apparatus is formed as a wedge locking means in which a wedge in the non-actuated state presses the plates to locking against each other with the interaction of stop bolts which keep the two sets of interengaged plates on a largest mutual distance, and in which a release of the locking engagement can be provided in that the wedge positively and against the action of a press spring therefore is released by rotating a cam curve which is mounted in the steering column carrier.

Preferably the complete apparatus is kept together by means of two locking bolts, and for providing the axial movement and concurrently therewith the rotation of the steering column carrier either of the two sets of locking plates preferably the locking plates of the stationary support part are formed both with a longitudinal slot by means of which the plates can be moved on one of the two locking bolts and also with a larger through recess by means of which the locking plates both can be moved in the longitudinal direction of the steering column and be rotated in relation to the second locking bolt.

By changing the number of interengaged or interleaved locking plates any wanted locking effect can be obtained. When using a large number of locking plates there is a need for a lower spring tension and thereby a lower force actuation of the cam curve for releasing the locking means than when during a less number of locking plates. Preferably the apparatus is formed so the spring force can simply be adjusted from outside.

Now the invention is to be described more in detail with reference to the accompanying drawings. It is, however, to be understood that the embodiments of the invention shown in the drawings are illustrative examples and that the invention is only restricted by the appended claims.

In the drawings

Figure 1:
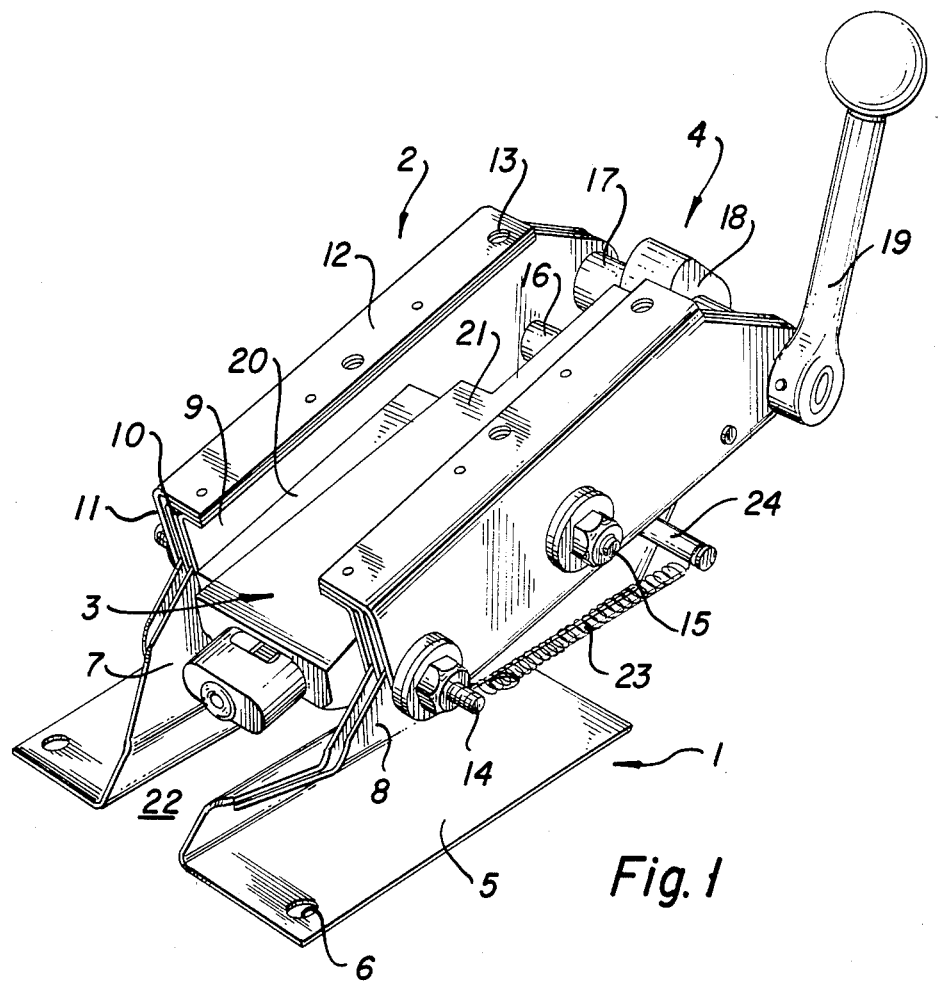
FIG. 1 is a perspective view of an adjustable steering column support according to the invention with the steering column removed for the sake of clearness.
Figure 2:
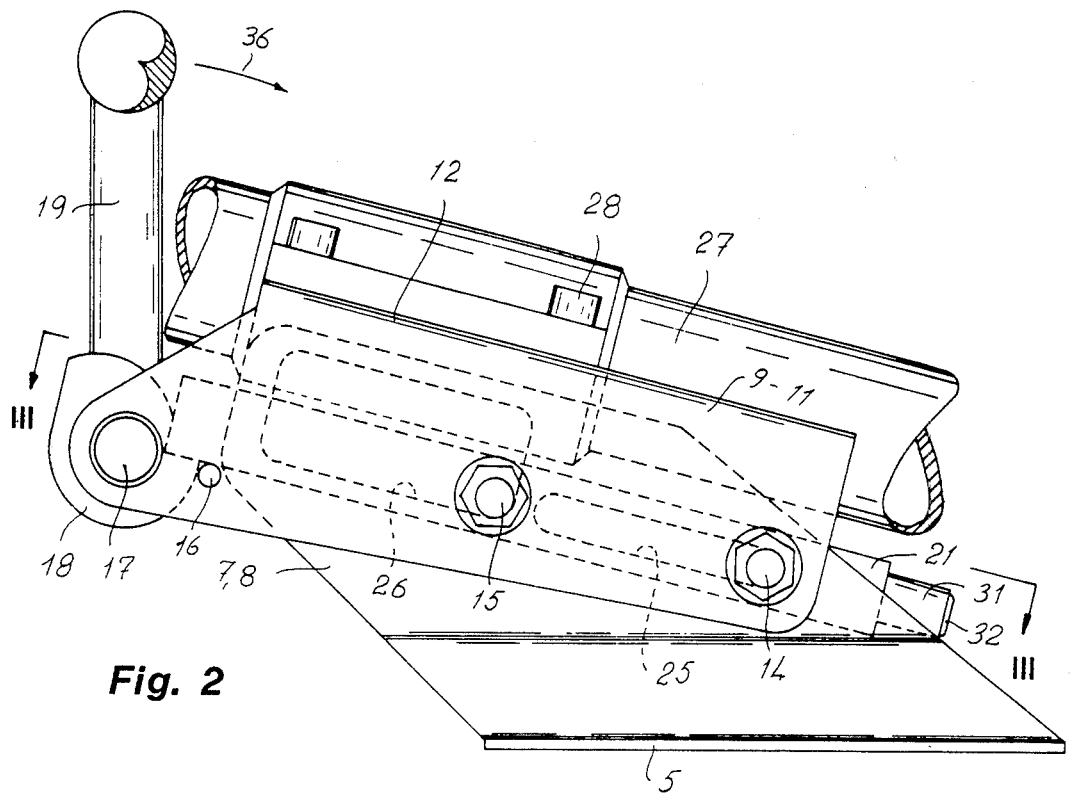
FIG. 2 is a side view of the steering column support shown in FIG. 1, partly in a transparent projection.
Figure 3:
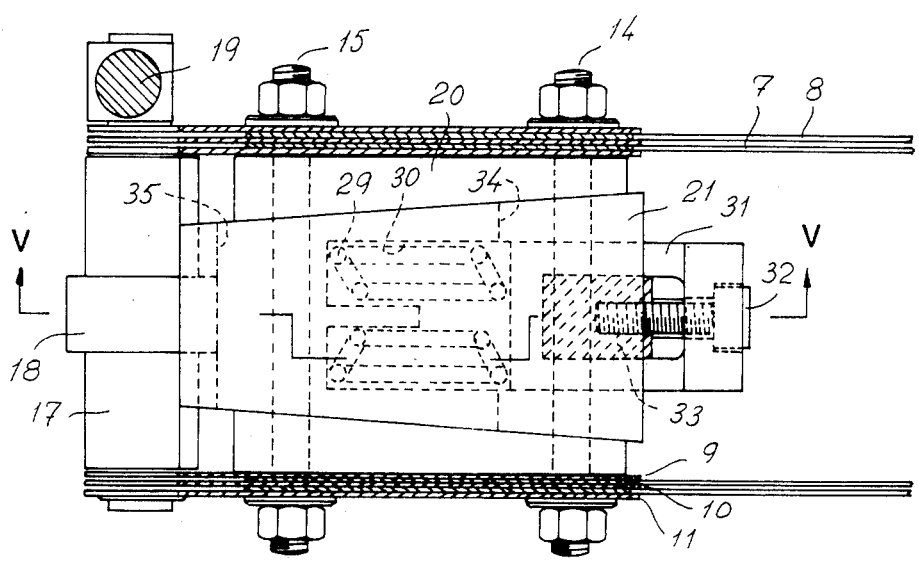
FIG. 3 is a cross section along line III—III of FIG. 2.
Figure 4:
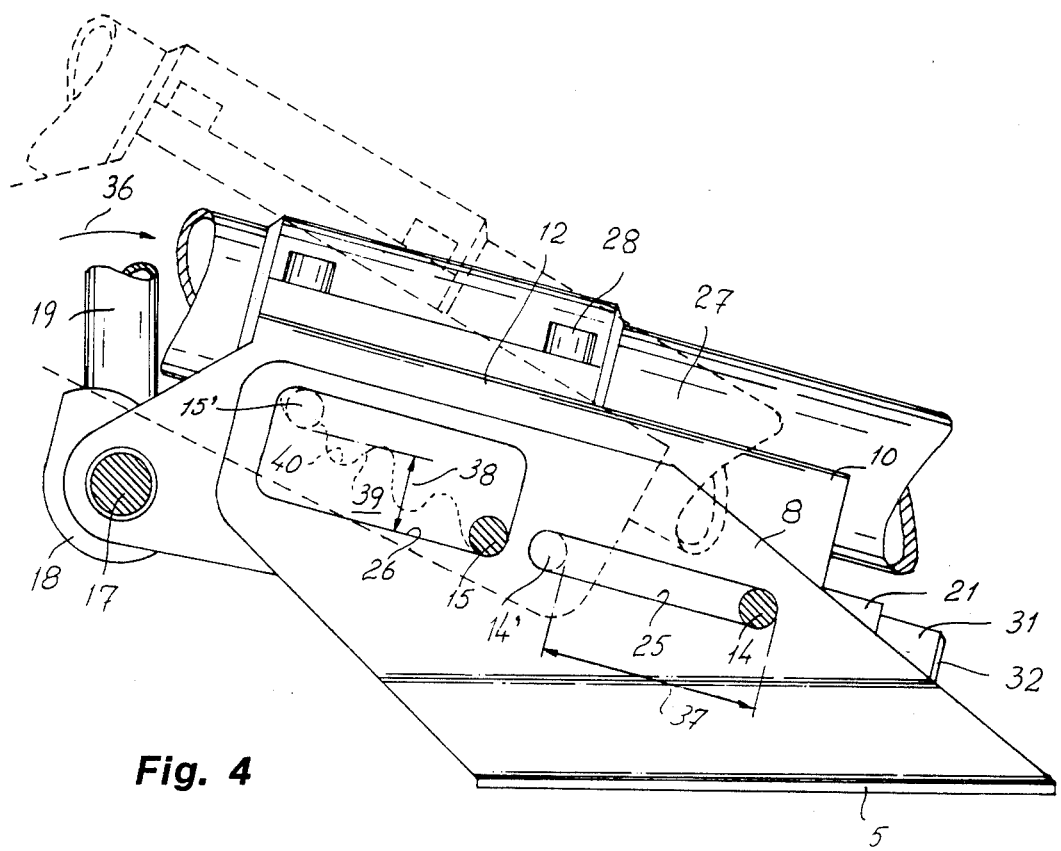

FIG. 4 diagrammatically shows the maximum displacement and rotation for a steering column as mounted in the steering column support according to FIGS. 1–3.

Figure 5:
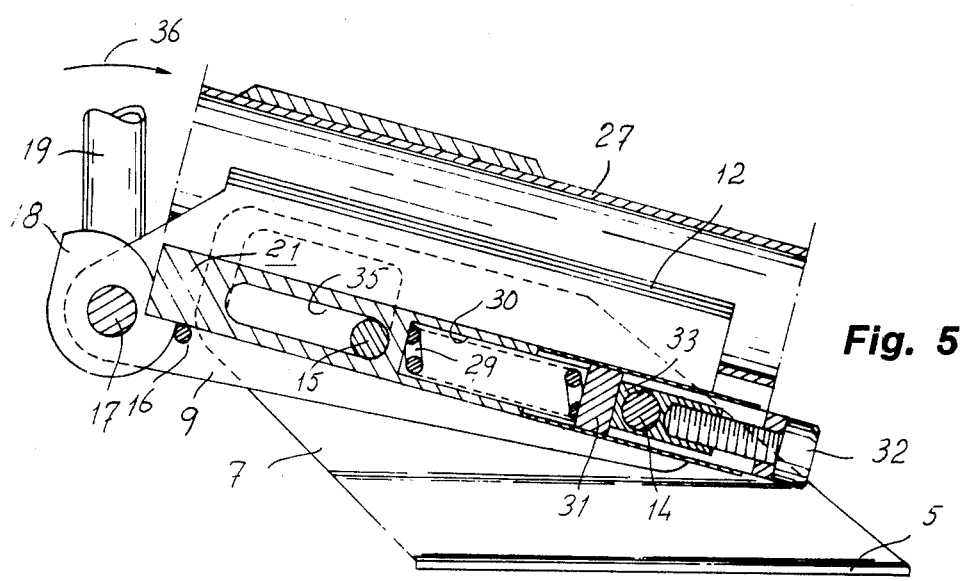

FIG. 5 is a vertical cross section along line V—V of FIG. 3 showing details of the locking device for the steering column support.

The steering column support shown in FIG. 1 generally comprises a stationary part 1 adapted to be fixedly mounted in the vehicle, a steering column carrier 2 on which a part of the steering column is adapted to be mounted and which is displaceable and rotatable in relation to the stationary part 1, a locking means 3 for interconnecting the stationary part and actuation means 4 for releasing the steering column carrier for adjusting the position of the steering wheel.

The steering column support is formed as two mutually interconnected halves which are mirror-image symmetrical and in which the locking means 3 and the actuation means 4 are mounted, between said two halves.

In the illustrated case the stationary part 1 is formed with a mounted plate 5 which by means of mounting bores 6 can be mounted stationarily at a suitable place on the vehicle. From the mounting plate 5 two locking plates 7 and 8 extend upwardly and are interleaved between three corresponding locking plates 9, 10 and 11 of the steering column carrier. It should be noted that the number of locking plates of the stationary part and of the steering column carrier may be varied as desired. In the most simple case both the stationary part and the steering column carrier have one single locking plate, but a safer locking is obtained with less pressure force if the two co-operating parts are formed with several pairs of locking plates. In the illustrated case the outer locking plate 8 is fixedly connected to the inner locking plate 7 at a place adjacent the mounting plate 5.

The steering column carrier 2 consists, as mentioned, of three locking plates 9, 10 and 11, which at the top are interconnected, for instance by means of spot welding, to a carrier plate 12 extending at an angle to the locking plates and to which a mounting means of the steering column can be mounted by means of bolts engaging in the bores 13. For keeping the two pairs of stationary parts and the steering column parts together there are, in this case, two through bolts 14 and 15, and as a spacing means the apparatus comprises a support pin 16 on the shaft 17 of a cam curve 18, which can be actuated by means of an outer handle 19.

The locking means 3 comprises a wedge means consisting of two outer wedges 20 which are fixedly mounted in the steering column carrier and an inner movable wedge 21 which with a projecting portion is spring biassed toward the cam curve 18 and is guided and supported by the support pin 16. For the spring actuation of the wedge 21 there is a spring means 22 which will be more fully explained hereinafter.

The steering column carrier 2 is axially and angularly displacable in relation to the stationary part 1, and for keeping the steering column carrier 2 in the outermost locking position there may be a tension spring 23 which acts between some parts of the steering column carrier, for instance the end of the bolt 14, and a part of the stationary support, for instance a projecting pin 24.

For making possible the displacement and the angular movement of the steering column carrier 2 in relation to the stationary part 1 either of the sets of locking plates 7-8 or 9-11 are formed with through slots. As best evident from FIGS. 2-4, in the illustrated case the locking plates 7 and 8 of the stationary part 1 are both formed with a longitudinal slot 25 in which the bolt 14 is movable, and also with a longitudinally extending wide slot 26 in which the bolt 15 is displacable in two directions which are perpendicularly to each other. With the bolt 14 as the rotation point the steering column carrier consequently can be moved axially and rotated within the space which is defined by the wider slot 26. The bolts 14 and 15 extend through bores in the locking plates 9-11 of the steering column carrier, and they are clamped to an exactly desired distance between the plates. As shown in the drawings the steering column 27 is mounted in the carrier plate 12 by means of screw joints 28, and the steering column thereby assists in forming the steering column support into a solid integral unit.

In FIG. 4 the steering column 27 is shown in full lines in its lowermost and most retracted position, and in dotted lines the steering column is shown in its most extended and its highest angular position. It is evident that the bolt 14 in the illustrated position 14' is at the end of the slot 25 and that the bolt 15 in the position 15' is at the end position and at the upper edge of the wide slot 26. It is obvious that the steering column in its most extended position can be angularly swung within the area which is defined by the width of the slot 26, that is until the bolt 15' comes into contact with the lower edge of the slot 26.

Previously mentioned and best illustrated in FIG. 3 the locking means comprises two outer wedges 20 which are fixedly mounted in the steering column carriers by means of the through bolts 14 and 15. Between the fixed wedges 20 there is a movable wedge 21, which has its outer end in contact with the cam curve 18, and which can be tightened and pressed in the direction towards the cam curve by means of two springs 29 which are mounted in cavities 30 of the inner wedge 21. For pressing and tightening the springs 29 there is a pressing means in the form of a piston 31, which is displacable in the same cavity 30 in which the springs 29 are mounted and which can be tightened by means of a tightening screw 30 which co-operates with a nut 33 that is mounted on the through bolt 14. By rotating the screw 32 in one direction the piston 31 is thus pressed inwardly in the inner wedge 21, and it thereby compresses the spring 29. By rotating the screw 32 in the opposite direction the piston is pulled out of the inner wedge and the spring tension is reduced.

To provide for displacement of the inner wedge possible, it is formed with through slots 34 and 35 in which the bolts 14 and 15 can slide during the movement of the wedge. By the force of the pressure springs 29 the inner wedge 21 is constantly pressed toward the cam curve 18 so that the inner wedge 21 forces the outer wedges 20 apart, and thus the locking plates 7-11 are pressed together to provide an effective locking of the steering column carrier in relation to the stationary part 1.

The apparatus works as follows. The normal position is assumed to be the one shown with full lines in FIG. 4. For releasing the steering column support 2 with the steering column 27 from the stationary part 1 the handle 19 together with the cam curve 18 is rotated in the counter clockwise direction as shown with the arrow 36, whereby the wedge 21 is moved to the right by the cam curve 18. The pressing force between the outer wedges 20 and hence between the locking plates 7, 8 and 9-11 respectively is released. Thereby the steering column carrier can be moved axially a distance corresponding to the distance 37 between the shaft 14-14' in the slot 25, and further the steering column carrier can be angularly moved through an angle which is defined by the vertical distance 38 between the shaft positions 15-15' in the slot 26. It is obvious that any desired range of axial displacements and angular dipslacements may be made by varying the length of the slots 25 and 26. Of course the slot 26 can be formed as a narrow straight slot extending at an angle to the slot 25, and whereby the steering column automatically is raised when extended, or the slot 26 may be formed as any wanted curve for providing different effects. For instance the slot 26 can be formed as a four stage curve 39 as indicated in FIG. 4, and whereby the lower parts 40 thereof give a further security against the steering column being unintentionally displaced from the adjusted position in that the bolt 15' engages cavity portions of said lower parts 40.

As previously mentioned the locking action can be varied either by changing the spring pressure of the spring 29, by mounting springs 29 of different strengths or by changing the edge angles of the wedges 20, 21 or varying the numbers of locking plates 7-8 and 9-11 respectively. By increasing the number of locking plates an increased locking effect is obtained, and thereby the spring force of the springs 29 may be correspondingly reduced. A reduced spring force of the springs 29 at the same time reduces necessary actuation force for the handle 19 for having the cam curve 18 press the inner wedge 21 back when re-adjusting the steering column.

After an adjustment of the steering column 27 has been made the handle 19 with the cam curve 18 is returned to its initial position in which the cam curve is steadily kept by the spring actuation of the inner ring 21.

I claim:

1. A vehicle steering column support that provides for adjustment of an elongated steering column lengthwise in opposite axial directions and angularly in opposite swinging directions that are transverse to said axial directions, said steering column support comprising:
A. a plurality of flatwise adjacent plates, each having a flat friction surface that opposes the friction surface on an adjacent plate, said surfaces being oriented parallel to said axial directions and said swinging direction, and said plates comprising
   (1) a relatively stationary support plate securable to a vehicle, and
   (2) a relatively movable carrier plate to which the steering column is secured, one of said plates being flatwise flexible into surface-to-surface frictional engagement with the other but being normally out of such engagement to permit shifting of the carrier plate in said directions relative to the support plate;
B. means on said one plate, at the side thereof remote from said other plate, defining a slide surface against which a flexing force can be applied that holds said one plate in said engagement with said other plate;
C. a wedging member disposed adjacent to said one plate and confined to motion relative to said one plate in a pair of opposite sliding directions that are parallel to said friction surfaces of the plates, said wedging member having a wedging surface at one side thereof that forces obliquely towards said friction surfaces of the plates and diverges from then in one of said sliding directions, said wedging surface being slidingly engaged with said slide surface so that movement of said wedging member in said one siding direction applies said flexing force to said slide surface;
D. spring means biasing said wedging member in said one sliding direction with a biasing force high enough to normally maintain said flexing force on said slide surface; and
E. release means comprising a lever which has a connection with said wedging member and which is manually swingable away from a normal position to move said wedging member in the other of said sliding directions and thus relieve said flexing force, said lever, through its connection with the wedging member, being biased by said spring means towards its said normal position to return thereto upon being released.

2. The steering column support of claim 1 wherein said support plate, said carrier plate, said slide surface and said wedging surface are all spaced to one side of a plane of symmetry which is parallel to said flat friction surfaces, and wherein said one plate is nearer said plane of symmetry than said other plate, further characterized by:
   (1) said plurality of plates further comprising
      (a) a second relatively stationary support plate securable to said vehicle, and
      (b) a second relatively movable carrier plate to which the steering column is secured, said second support and carrier plates being spaced to the other side of said plane of symmetry and being arranged, relative to that plane, in symmetrical relation to the respective first mentioned support and carrier plates;
   (2) means on one of said second plates defining a second slide surface which is spaced to said other side of said plane and, relative to that plane, is symmetrical to the first mentioned slide surface; and
   (3) said wedging member having a second side wedging surface which is spaced to said other side of said plane and, relative to that plane, is symmetrical to the first mentioned wedging surface.

3. The steering column support of claim 2, further characterized by:
   (4) a pair of elongated through bolts which extend through all of said plates with their axes normal to said plane, and through bolts
      (a) being engaged with the plate farthest from said plane at each side thereof to confine those plates against divergent flexing, and
      (b) extending through enlarged holes in others of said plurality of plates that provide for limited edgewise motion of the carrier plates relative to the support plates.

4. The steering column support of claim 3 wherein said wedging member has slots therein which are elongated in said sliding directions and through which said through bolts extend to cooperate with said slots in confining the wedging member to motion in said sliding directions.

5. The steering column support of claim 2 wherein said plurality of plates comprises, at each side of said plane, at least five flatwise adjacent plates, alternate ones of which are relatively stationary support plates securable to said vehicle and the remainder of which are interleaved with those support plates and are relatively movable carrier plates to which said steering column is connected.

* * * * *